Figure 1:
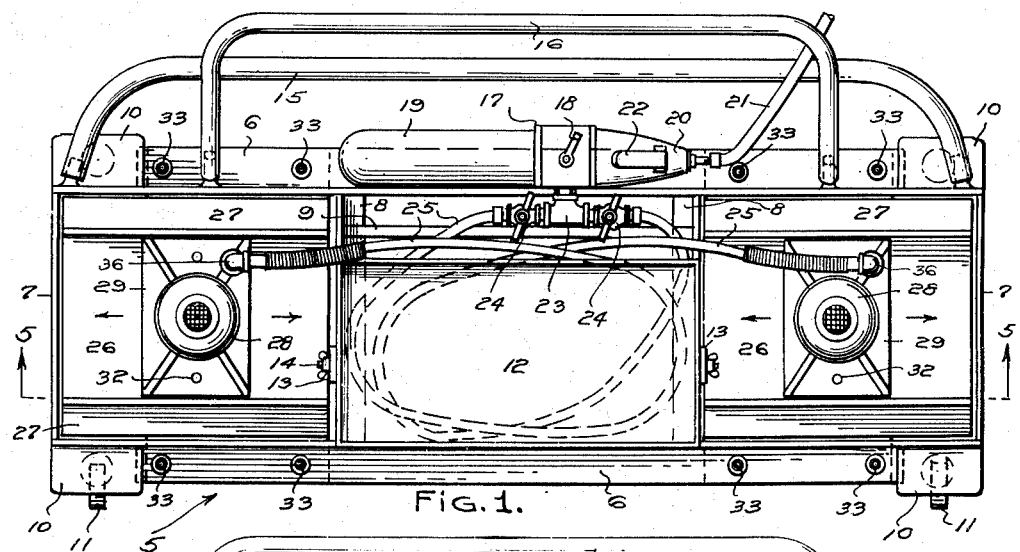

April 28, 1953 — J. A. GRIFFIN — 2,636,715
DOLLY FOR MULTIPLE HYDRAULIC JACKS
Filed Aug. 29, 1950 — 2 SHEETS—SHEET 1

INVENTOR.
JOHN A. GRIFFIN,
BY
ATTORNEY.

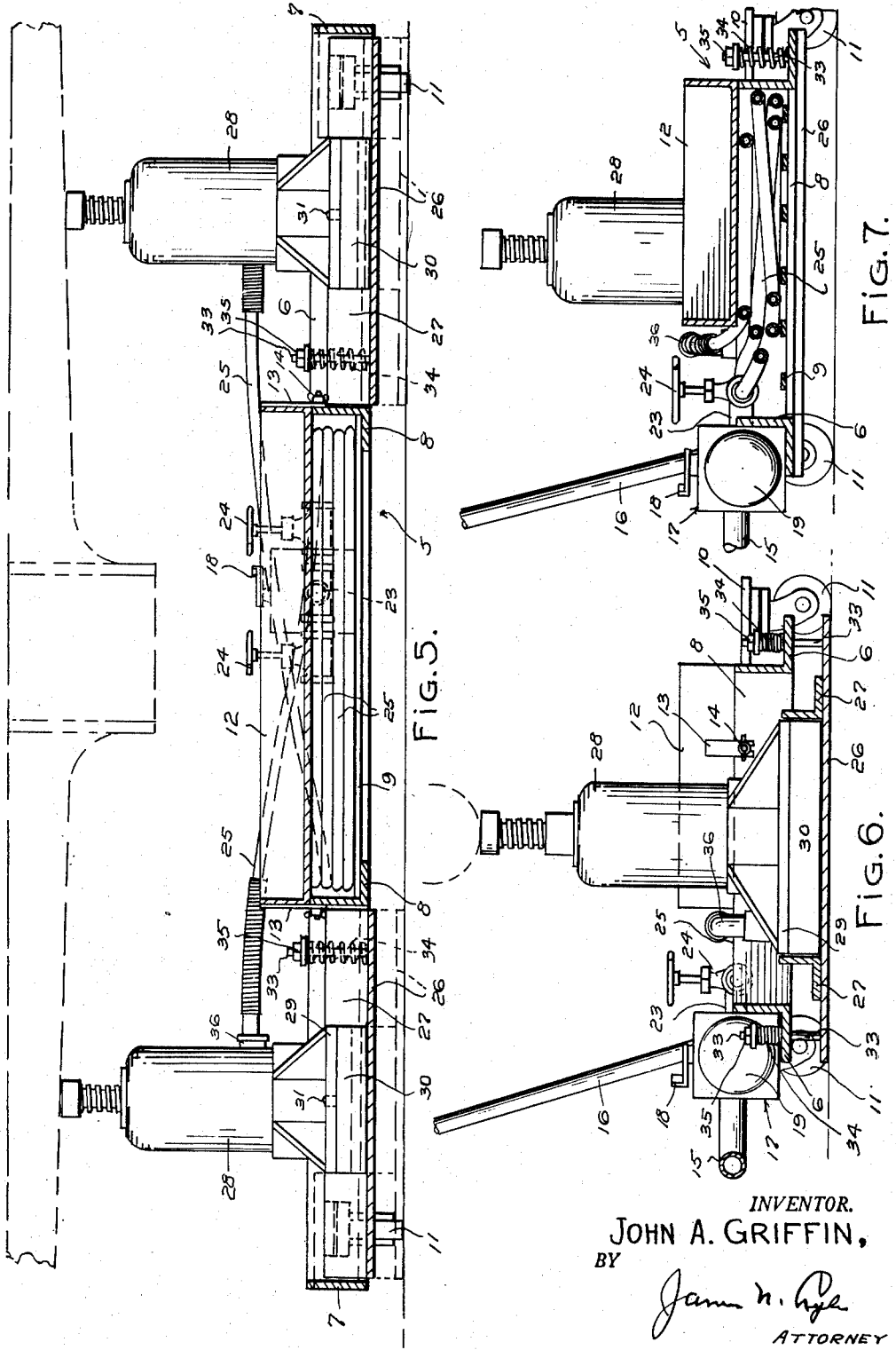

Patented Apr. 28, 1953

2,636,715

UNITED STATES PATENT OFFICE 2,636,715

DOLLY FOR MULTIPLE HYDRAULIC JACKS

John A. Griffin, Fort Lauderdale, Fla.

Application August 29, 1950, Serial No. 181,989

1 Claim. (Cl. 254—1)

This invention relates to improvements in a dolly for the convenient shiftable support of a plurality of hydraulic jacks.

It is an object of the present invention to provide a dolly for the support of a pair of hydraulic jacks, having ground caster wheels to facilitate the shifting of the dolly with its jacks beneath a vehicle to be easily positioned beneath the axle or other part of the vehicle with the jacks arranged in spaced relation to enable the simultaneous elevating of the vehicle axle in a level manner and which will maintain the vehicle axle in elevated position for an indefinite period, thus enabling a mechanic to proceed with various adjustments with a minimum of effort.

In elevating such vehicles as trucks, busses or the like, it has been common practice to employ a conventional single point jack and it frequently happens, that due to overbalancing weights, such as the gasoline tank upon one side, there is a tendency for the vehicle to lean or be lower upon one side than the other, thus requiring the operator to employ additional jacks in order that the axle shall be level and it was with this and other features in mind, that the present invention was provided, having means to simultaneously raise or elevate the axle at an identical height on each end by the use of a pair of hydraulic jacks supported in a novel manner upon a wheeled dolly that may be easily shifted beneath the vehicle by suitable handle bar devices without the necessity of the operator crawling beneath the vehicle to adjust the jacks and then by suitable valve mechanism, operated through the medium of a compressed air hydraulic pump to cause the jacks to be elevated.

The invention further contemplates a novel combination of hydraulic pump, valves and tubing, whereby the jacks may be independently operated and, after elevated to the proper height, locked against accidental lowering.

The invention further contemplates supporting plates for the jacks that are maintained normally elevated with respect to the dolly whereby the jacks are supported in non-ground engaging position during the shifting of the dolly, such plates and their supported jacks after positioning, adapted to move downwardly to ground engaging position when a load is placed on the jacks whereby the entire load upon the jacks is transferred to the ground surface, thus permitting a relatively light dolly construction designed primarily for conveying the jacks to a point of use.

Another novel feature of the invention resides in blocks adapted to be positioned beneath the base of the jacks to increase their effective raising height, with the blocks and the jacks being shiftable endwise of the dolly for increasing or decreasing the distance between points of engagement with the work, with each jack connected to its respective valve mechanism by an adequate length of hydraulic tubing that will enable the operator to completely remove the jack from the dolly for various and sundry uses.

Other novel features and advantages of the invention will be readily apparent during the course of the following description, reference being had to the accompanying drawings, wherein has been illustrated a preferred embodiment of the invention and wherein like characters of reference denote like parts throughout the several figures.

Figure 2:
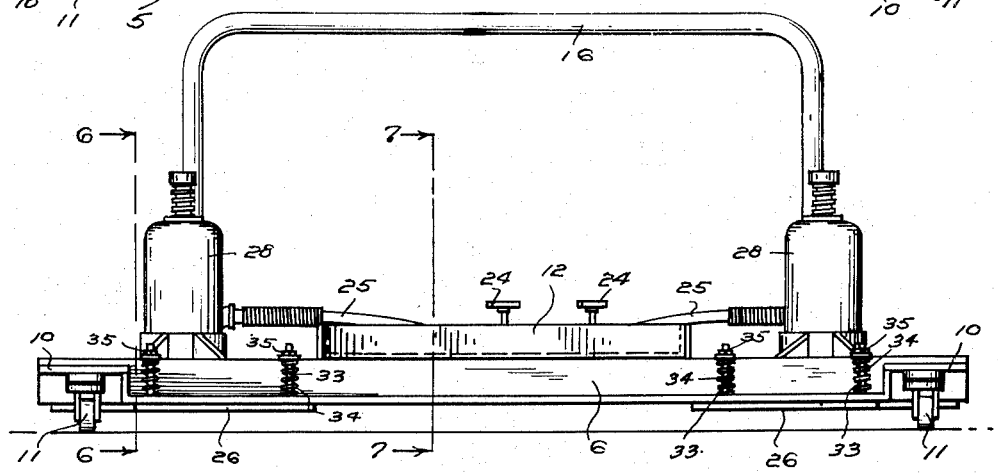
Figure 3:
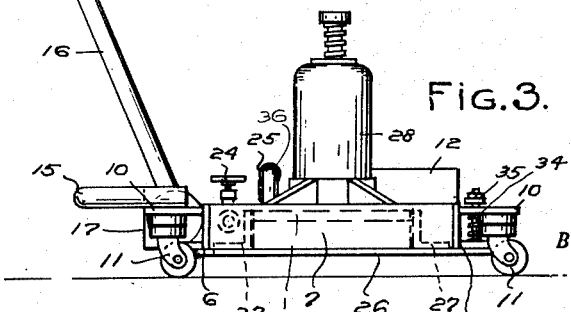
Figure 4:
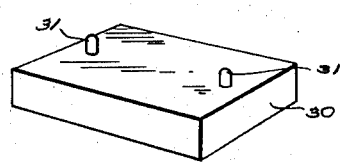

Referring to the drawings:

Figure 1 is a top plan view of a device constructed in accordance with the invention, Figure 2 is a side elevation thereof, Figure 3 is an end view thereof, Figure 4 is a perspective view of a jack elevating block, Figure 5 is a vertical longitudinal section of the device, taken on line 5—5 of Figure 1, Figure 6 is a transverse section, taken on line 6—6 of Figure 2 and, Figure 7 is a transverse section, taken on line 7—7 of Figure 2.

Referring specifically to the drawings, the numeral 5 designates a dolly as a whole, generally rectangular in top plan and comprising spaced parallel side angle irons 6 of equal length, rigidly tied together at their ends by cross bars 7, welded thereto. The angle irons 6 and the end bars 7 form a rectangular frame. Spaced inwardly from the ends of the frame an equal distance, angle irons 8, parallel to each other and with the bars 7, span the frame and are welded thereto. Strips 9 extend between the angle irons 8 and form a slatted bottom for the support of coiled hydraulic tubing, to be described. At each of its corners, the frame is provided with horizontally arranged outwardly extended plates 10, having mounted thereberneath, ground caster wheels 11, through the medium of which the frame and associated elements are maintained is spaced relation to the ground to facilitate the transfer of the dolly from place to place. A tool tray 12 is jointly supported upon the upper edges of one angle iron 6 and the transverse angle irons 8 and is held against accidental displacement by slotted plates 13, engaged by winged nuts 14. A horizontally arranged handle bar 15 is rigidly connected to the dolly on one side to facilitate the shifting of the dolly beneath the vehicle, while an upwardly directed and outwardly inclined handle bar 16 is detachably connected to one angle iron 6 through the medium of studs and serves to facilitate shifting of the dolly from place to place. When the dolly is to be moved beneath the vehicle, the handle bar 16 is usually removed.

Mounted upon the side angle iron 6, adjacent the handle bar 15, is a compressed air actuated hydraulic pump 17, having a control valve 18 for controlling the oil cylinder 19. The pump has connection at one end 20, with a compressed air line 21. An air control pedal 22 is employed to control the entry of compressed air to the actuating mechanism of the pump. A T-coupling 23 is connected with the pump and lies within the frame 5, as shown in Figure 1. At its opposite ends, the coupling 23 has connection with shut-off valves 24. The valves 24 have connection with and serve to control the flow of fluid through flexible hydraulic tubing 25, normally coiled upon the strips 9, with their opposite ends having connection with hydraulic jacks, to be described.

The mounting for the hydraulic jacks consists of flat plates 26. The plates 26 are of a size corresponding to the openings of the frame between the end bars 7 and the angle irons 8 and are arranged at opposite ends of the dolly, as shown. Each plate 26 is reinforced by upstanding angle irons 27, parallel with each other in spaced relation and lying wholly within the frame opening. The angle irons 27 are preferably welded to the plates 26 with their vertical flanges in opposed relation and jointly form a slide channel for the resting support of conventional hydraulic jacks 28. The jacks 28, as here shown, have their base flanges 29 supported upon elevating blocks 30. The flanges 29 are held against lateral shifting with respect to the blocks, by dowel pins 31, engaging in openings 32 formed in the base of the jacks. The blocks 30 may or may not be used and are employed to give added elevating height to the jacks where necessary. Usually, when employing the device on low clearance vehicles, the blocks 30 are removed, permitting the base of the jacks to rest upon the plates 26. The jacks may be bodily shifted by sliding them endwise in the channels formed by the angle irons 27 to facilitate the engagement of the jack head with the structure to be elevated. To facilitate the transfer of the dolly and its supported jacks from place to place, it is highly desirous that the jacks and their supporting plates 26 be maintained in non-ground engaging position. To accomplish this, each of the plates 26 are extended outwardly to underlie the horizontal flange of the angle irons 6 and at each corner of the extensions, the plates are provided with vertically arranged rods 33, threaded at their upper ends. The rods at assembly pass through openings formed in the horizontal flange of the angle irons 6 and compression springs 34 are positioned over each rod 33 and suitable tension placed thereon by washers and nuts 35. The springs bearing against the angle irons 6 and the nuts 35, exert an upward pressure, causing the plates 26 and their supported jacks 28 to normally remain in elevated position, with the extensions of the plates 26 bearing against the under surface of the irons 6. The plates 26 and their supported jacks 28 are thereby permitted to partake of vertical shifting movement. When a load is placed upon the jacks, the jacks and the plates 26 are shifted downwardly against the tension of the springs 34 to be positioned upon the ground, thus transferring the entire load to the ground surface. Upon a removal of the load as when the jacks are retracted, the plates automatically rise to non-ground engaging position, thus permitting the dolly to be freely wheeled from beneath a vehicle. Each jack 28 is equipped with a fluid connection 36, coupled with the free ends of the fluid lines 25.

In the use of the device, the operator transfers the dolly to the place of use, by using the handle bar 16. Prior to movement of the dolly beneath the vehicle, the handle bar 16 is removed and the operator then properly positions the jacks 28 beneath the part to be elevated, by using the handle bar 15. It may be necessary to slide the jacks endwise for more advantageous points of contact with the vehicle structure. After the dolly has been properly positioned, the air hose 21 is connected to the pump 17 and the valve 18 rotated to operating position. The valves 24 are then opened and the device is ready for actuation. It will of course be understood, that the operator will adjust the jack heads to a point of contact with the structure. The pedal 22 is then depressed, permitting air to flow to the pump 17, setting the pump in action and forcing fluid through the lines 25 to the jacks 28 simultaneously. Release of the pedal 22 stops the pump actuation. After the jacks have been elevated to the proper height, the valves 24 may be closed and the jacks locked in their elevated position. Should it be desired to elevate one side of the vehicle higher than the other, one valve 24 is closed, while the other remains open. Operation of the pedal 22 then actuates the pump to further elevate the other jack. Each jack may therefore be independently controlled. To lower the jacks, both valves 24 are opened and the valve 18 shifted to permit a flow of the fluid from the jacks to the pump. It is desirable at times to employ the jacks for various other uses and it was for that reason, that a relatively long tubing 25 has been employed. As before stated, this tubing is normally coiled upon the strips 9, beneath the tool tray 12. When the jack or jacks are to be used for other purposes, the tool tray 12 is removed and the jack or jacks lifted bodily from their supporting plates 26 and moved to the particular point of use, carrying with it the fluid line 25. If only one jack is being employed, the valve 24 controlling the other jack is closed. The other valve is then opened and the valve 18 shifted to operative position, after which the operator compresses the pedal 22 in the usual manner to actuate the pump 17. Thus, the device is extremely flexible for the average garage use in handling vehicles of various tonnage. The dolly supports only the weight of the jacks and the pump and associated mechanism, while the entire weight of the load being elevated is supported upon the ground by the shifting of the plates 26 downwardly to ground engaging position. Immediately upon a release of the load, the plates and their supported jacks will move upward under the influence of the springs 34, after which the operator may withdraw the dolly from beneath the vehicle by grasping and pulling upon the handle bar 15. The other handle bar 16 may then be reengaged with its lugs and the dolly transferred to its place of storage.

It will be seen from the foregoing that a very novel and highly efficient device has been provided to transfer and properly position a pair of hydraulic jacks beneath a vehicle. The structure is simple, cheap to manufacture, is strong, durable and extremely convenient in use.

While a preferred form of the invention has been shown and described, it will be apparent that various changes in the shape, size and arrangement of parts may be resorted to as fall within the spirit of the invention or the scope of the subjoined claim.

Having described my invention, what I claim as new and desire to secure by Letters Patent is:

A hydraulic jack supporting and transportable dolly of rigid rectangular shape comprising a pair of parallel and spaced apart angle irons in opposed relation and tied rigidly together by a bar at its opposite ends, brackets fixed at each corner of the dolly, caster wheels carried by each bracket for supporting the dolly in spaced relation to the ground, parallel angle irons rigidly connected to the side angles inwardly of the ends of the dolly, the last named angles being parallel to the bars, the several angle irons and the bars defining identical openings at opposite ends of the dolly, hydraulic jack supporting plates mounted at the opposite ends of the dolly, the plates having a length substantially co-extensive with the openings and a width to underlie horizontal flanges formed on the first named angle irons, spring devices between the flanges and the plates to yieldably support the plates in elevated and non-ground engaging position, angle irons fixed to the upper surface of each plate in parallel spaced relation to form slide channels for base plates carried by hydraulic jacks, the jacks being shiftable in the channels in a horizontal plane toward and from each other, the jacks and their supporting plates being shiftable downwardly to ground engaging position against the tension of the spring devices when a load is placed upon the jacks and a handle bar carried by the dolly for the manual shifting of the dolly upon its caster wheels.

JOHN A. GRIFFIN.

References Cited in the file of this patent

UNITED STATES PATENTS

| Number | Name | Date |
|---|---|---|
| 949,331 | Scholle | Feb. 15, 1910 |
| 1,415,857 | Avery | May 16, 1922 |
| 1,804,997 | Manley | May 12, 1931 |
| 2,545,403 | Wrenn | Mar. 13, 1951 |

FOREIGN PATENTS

| Number | Country | Date |
|---|---|---|
| 721,639 | France | Dec. 22, 1931 |